(12) United States Patent
Liu et al.

(10) Patent No.: US 11,295,767 B2
(45) Date of Patent: Apr. 5, 2022

(54) PERPENDICULAR MAGNETIC RECORDING (PMR) WRITER WITH RECESSED LEADING SHIELD

(71) Applicant: Headway Technologies, Inc., Milpitas, CA (US)

(72) Inventors: Ying Liu, San Jose, CA (US); Yuhui Tang, Milpitas, CA (US); Yue Liu, Fremont, CA (US); Kei Hirata, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/209,136

(22) Filed: Dec. 4, 2018

(65) Prior Publication Data

US 2020/0176021 A1 Jun. 4, 2020

(51) Int. Cl.
*G11B 5/11* (2006.01)
(52) U.S. Cl.
CPC ..................................... *G11B 5/11* (2013.01)
(58) Field of Classification Search
None
See application file for complete search history.

(56) References Cited

U.S. PATENT DOCUMENTS

| 7,426,092 | B2 * | 9/2008 | Fukui | G11B 5/127 360/125.06 |
| 8,345,388 | B2 | 1/2013 | Guan et al. | |
| 8,385,020 | B2 | 2/2013 | Min | |
| 9,036,299 | B2 | 5/2015 | Chembrolu | |
| 9,153,253 | B2 * | 10/2015 | Yamaguchi | G11B 5/1278 |
| 9,361,912 | B1 * | 6/2016 | Liu | G11B 5/187 |
| 9,361,923 | B1 * | 6/2016 | Liu | G11B 5/3116 |
| 10,014,021 | B1 * | 7/2018 | Liu | G11B 5/1278 |
| 2012/0127611 | A1 * | 5/2012 | Min | G11B 5/1278 360/123.12 |
| 2012/0182644 | A1 * | 7/2012 | Matsumoto | G11B 5/1278 360/99.08 |
| 2015/0194169 | A1 * | 7/2015 | Yamaguchi | G11B 5/1278 360/235.4 |
| 2018/0005648 | A1 | 1/2018 | Fuji et al. | |
| 2018/0144768 | A1 * | 5/2018 | Liu | G11B 5/3116 |
| 2018/0330748 | A1 * | 11/2018 | Liu | G11B 5/112 |

FOREIGN PATENT DOCUMENTS

JP          2001357642 A     * 12/2001

* cited by examiner

*Primary Examiner* — William J Klimowicz
(74) *Attorney, Agent, or Firm* — Saile Ackerman LLC; Stephen B. Ackerman

(57) ABSTRACT

A PMR (perpendicular magnetic recording) write head includes a main write pole (MP) that is surrounded by magnetic shields, including laterally disposed side shields (SS), a trailing shield (TS) and a leading shield (LS). The leading shield includes a leading-edge taper (LET) that conformally abuts a tapered side of the write pole. The leading-edge shield and the leading-edge taper can be independently recessed in a proximal direction away from an air bearing surface (ABS) plane so that one or the other of them is recessed and the other remains coplanar with the ABS, or both are recessed by independent amounts. In another configuration the LS is not planar but has a recessed portion in a center track region and two surrounding regions that are coplanar with the ABS plane.

8 Claims, 8 Drawing Sheets

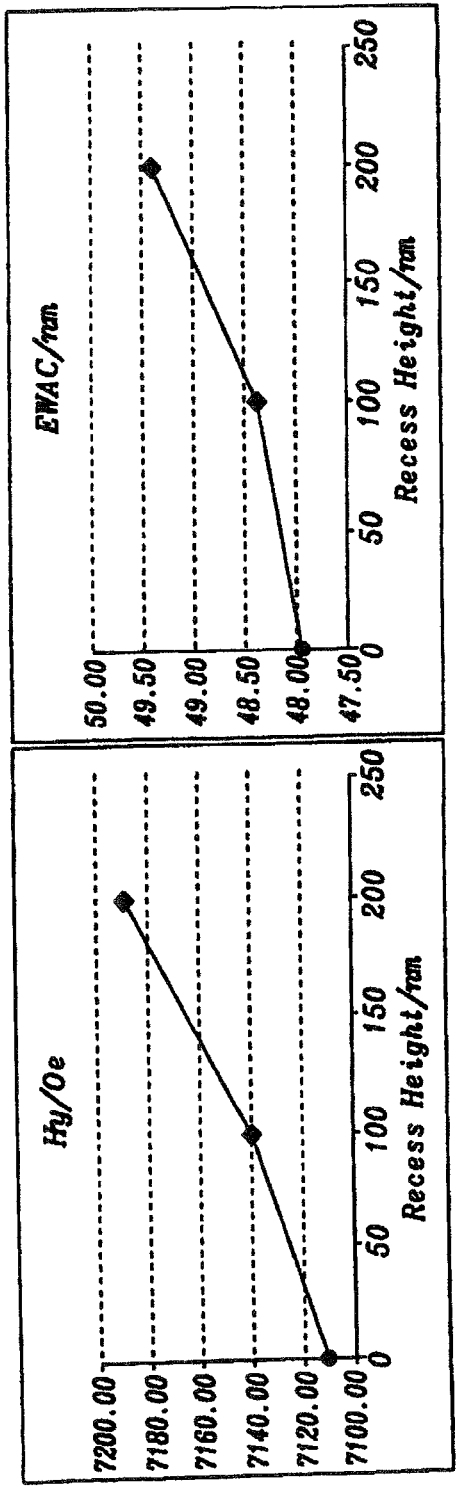
FIG. 3A
FIG. 3B
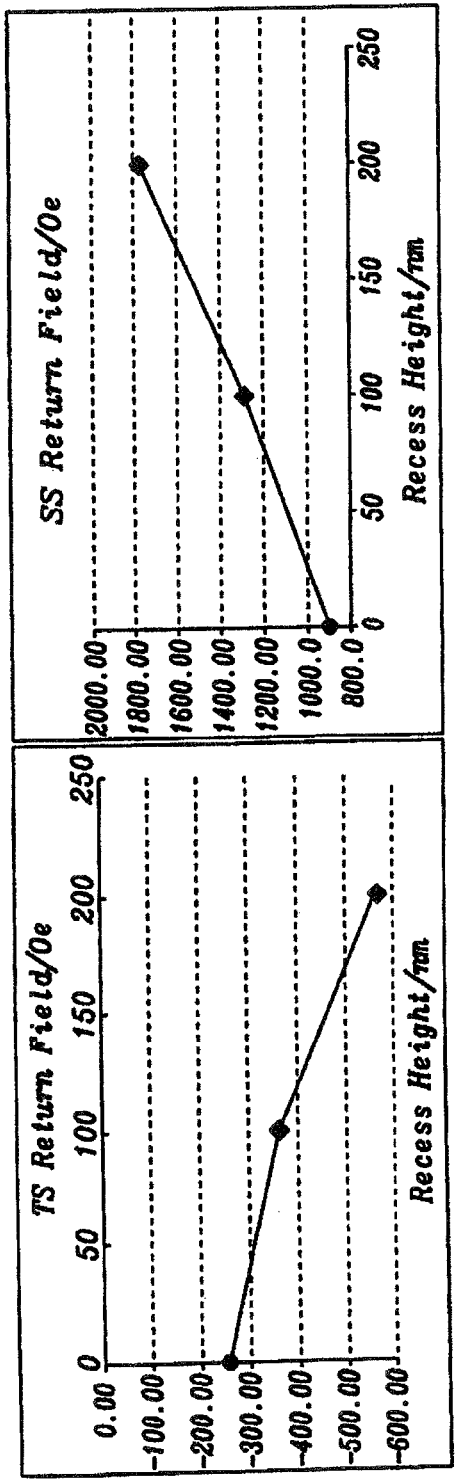
FIG. 3C
FIG. 3D

PERPENDICULAR MAGNETIC RECORDING (PMR) WRITER WITH RECESSED LEADING SHIELD

BACKGROUND

1. Technical Field

This disclosure relates generally to a writer used in perpendicular magnetic recording (PMR) and particularly to the design of shields that improve their performance.

2. Description

In today's PMR design, an important role of the Leading Shield (LS) is to prevent Side Shield (SS) saturation and leading side induced adjacent track interference (ATI). In current (i.e., prior art) writer designs the LS is exposed at the ABS to support the SS, however the downside of this exposure is that the LS will attract the main pole (MP) field that is returned from the disk soft underlayer (SUL) and reduce the trailing side return field. Keeping in mind the important measures of "bits per inch" (BPI) and "tracks per inch" (TPI), in this disclosure we propose a PMR writer design where OW/BPI will be enhanced, while ATI/TPI can be preserved.

Examples are taught in U.S. Patent Application 2018/0005648 (Fujii et al—TDK) discloses recessing part of the leading shield from the ABS. U.S. Pat. No. 9,036,299 (Chembrolu) discloses a portion of a wrap-around shield recessed from the ABS. U.S. Pat. No. 8,385,020 (Min) teaches recessed leading shield, side shield, and write shield. U.S. Pat. No. 8,345,388 (Guan et al.) shows recessed edges of shields at the ABS. None of these examples provide the effectiveness and degree of control that we provide in this disclosure.

SUMMARY

We disclose a PMR writer with a leading shield (LS) layer and a contiguous "leading shield taper" (LET) layer, both having distal edges (distal referring to an edge closest to the air-bearing surface (ABS)) in planes parallel to the ABS plane but not coplanar with the ABS plane so that both layers may be independently recessed from the ABS plane. As main pole (MP) magnetic flux emitted from the MP returns from the SUL of an adjacent magnetic recording medium, the flux distribution is very sensitive to spacing from the ABS to the SUL. Therefore, a larger gap between the LS and the SUL of the magnetic recording media can guarantee the maximum return field shifting to the trailing side of the main pole. As the overall LS volume and LS/SS connection is kept the same, TPI loss in this design configuration is minimized.

FIG. 1A shows a cross-sectional plane (perpendicular to the ABS plane 10) cut through the center of the main pole (MP) 20, of a prior art PMR writer (one currently in use) and FIG. 1B shows the same illustration for the presently disclosed PMR writer. Note, edges of the elements of the PMR (shields, etc.) extending closest to the ABS 10 will be referred to as distal edges. Opposite edges and other portions further away from the ABS will be considered as proximal.

Referring first to FIG. 1A, there is shown the MP 20, extending to the ABS 10 where its tip 25 has a trapezoidal shape (not shown here) in the ABS plane (shown in FIGS. 5A & 5B). The cross-section of a trailing-edge shield (TS) is shown as two layers; layer 30 is low moment ($B_s$) material, typically 1 kG to 22 kG, and 35 is a high moment material, typically 16 kG to 24 kG. The leading-edge shield (LS), is shown as 40 and its material has a moment between 1 kG and 19 kG, typically lower than the side shields (not shown here).

A leading-edge taper (LET) layer is shown as 50 and it can have a moment that is independent of the leading-edge shield material. The LET taper is separated from the side of the MP by a narrow gap 51, but the taper is conformal to a complementary taper along the side of the MP as shown in the figure. A soft underlayer (SUL) 60 of a magnetic recording medium is shown beneath the ABS 10. Magnetic flux lines 70 are shown emerging from the tip of the main pole 25, striking the SUL 60 and returning from the SUL 60 to enter the various shields. The flux intensity is represented schematically by the number of flux lines, which is here shown to be equal in number returning on the leading-edge side and trailing edge side of the main pole. Surrounding filler material, 90 is dielectric or, can be non-magnetic metals.

Referring now to FIG. 1B, the presently disclosed design shows a TS with two layers, 30 and 35 as in FIG. 1A. There is also the cross-section of a MP 20 extending to the ABS 10. The leading-edge side of the MP now shows two independently positioned layers adjacent to it, a LET 50 and a LS 45. The distal surface of the leading-edge shield 45 is now recessed (raised) above the ABS 10, although still parallel to the ABS, and is tapered to have an inner edge 55 coplanar with the inner edge of the LET 50 and conformal to the taper of the MP, although the tapered edges of the LS and LET are now shifted alongside and relative to each other. In this design configuration, the recess amount of the LET and LS can be independent of each other. Thus, there are three options for this recess configuration: LS recessed only, LET recessed only, and LS and LET both recessed independently. FIG. 1B shows the LS recess-only configuration, configuration 1.

(i) Referring now to FIGS. 2A and 2B, there is shown schematically the LS-LET-SS configuration in a cross-sectional view through the central plane of the MP 20 in FIG. 2A (as in FIG. 1B). The difference between this configuration and that of 1B is that the LS 45 is now recessed from the ABS by 200 nm and is vertically separated from the LET layer 50, which remains coplanar with the ABS plane. FIG. 2B shows the same configuration as FIG. 2A, but the cross-sectional plane of the figure is sufficiently off the central axis that a portion of the side-shield (SS) 80 is visible along with the recessed LS 45. Note that FIG. 5A is an ABS view of the writer that shows all the shields (side shields (SS) 80, TS 30, LS 40 so that the connection between the SS and the LS in FIG. 2A may be visualized. As the LS throat height (thickness measured vertically from the ABS) is 150 nm in FIG. 2A and LS recess height away from the ABS is 200 nm, the LS and LET appear as disconnected in the FIG. 2A view. However, as the SS throat height (vertical thickness) is 600 nm in this sketch which is off-center at the SS-LS connection area, the area of connection between SS and LS is kept the same, with LET connection to SS unchanged, and LS connection to SS shifted up the perpendicular direction.

Referring to FIGS. 3A, 3B, 3C and 3D there is shown the results of simulations conducted using the Finite Element Method (FEM), to validate the performance of the disclosed design. The different graphical figures show the FEM simulation result for writer heads with different LS recess height. With larger amount of LS recess, the head field is slightly enhanced and the trailing shield gains much more return field (which goes much more negative), thereby fulfilling the design purpose as expected.

The vertical axis in FIG. 3A measures perpendicular field strength; in FIG. 3B it measures erasure width (EWAC); in FIG. 3C it measures trailing shield return field; and in FIG. 3D it measures the side shield return field. Horizontal axes measure recess height of the LS. The black dot in each figure refers to the exemplary prior-art writer case with LS exposed at ABS (0 recess height). In this simulation, LS volume is kept the same for different recess amount, meaning LS thickness minus recess height is kept at 150 nm for the three different cases.

BRIEF DESCRIPTION OF THE DRAWINGS

FIGS. 3A, 3B, 3C and 3D are FEM simulation result for the proposed structure. Vertical axis refers to (a) perpendicular field strength; (c) erasure width; (c) trailing shield return field; (d) side shield return field. Horizontal axes refer to recess height of the LS. The black dot in each figure refers to current prior-art case with LS exposed at ABS (0 recess height). In this simulation, LS volume is kept the same for different recess amount, meaning LS TH minus recess height is kept 150 nm for the three different cases.

DETAILED DESCRIPTION

Several recess configurations will now be described. The simple recess configuration (configuration 1) is to recess the entire LS along its full cross-track width (up to 20 um). A second configuration (configuration 2) recesses only a center track portion of the LS, so cross-track recess width will range from 100 nm (nanometers) to 5 um (microns). In the second configuration, while the LS volume at track center is recessed from ABS, the region laterally outside of cross track recess width is still exposed to (not recessed from) the ABS. A third configuration permits recessing the LS and a leading edge taper (LET) by independent amounts.

As the MP field is primarily concentrated in the track center, the SUL return field (and corresponding flux) also depends primarily on the center area. By controlling the cross-track recess width, the majority of the SUL return flux path will still be shifted to the trailing side, but the balance between the (SS saturation/EWAC growth) and TS (return field gain/OW gain) can be fine-tuned. In addition, the down-track thickness of the recessed area can also range from 50 nm to 1 um, which also provides an extra control variable for tuning TPI/BPI balance. The throat height (TH) of the LS can also range from 200 nm to 1 um. Under fixed recess height and cross track recess width, a thicker LS TH can provide better protection for SS saturation and EWAC confinement, while thinner LS TH can further enhance TS return field and OW.

Figure 1A:
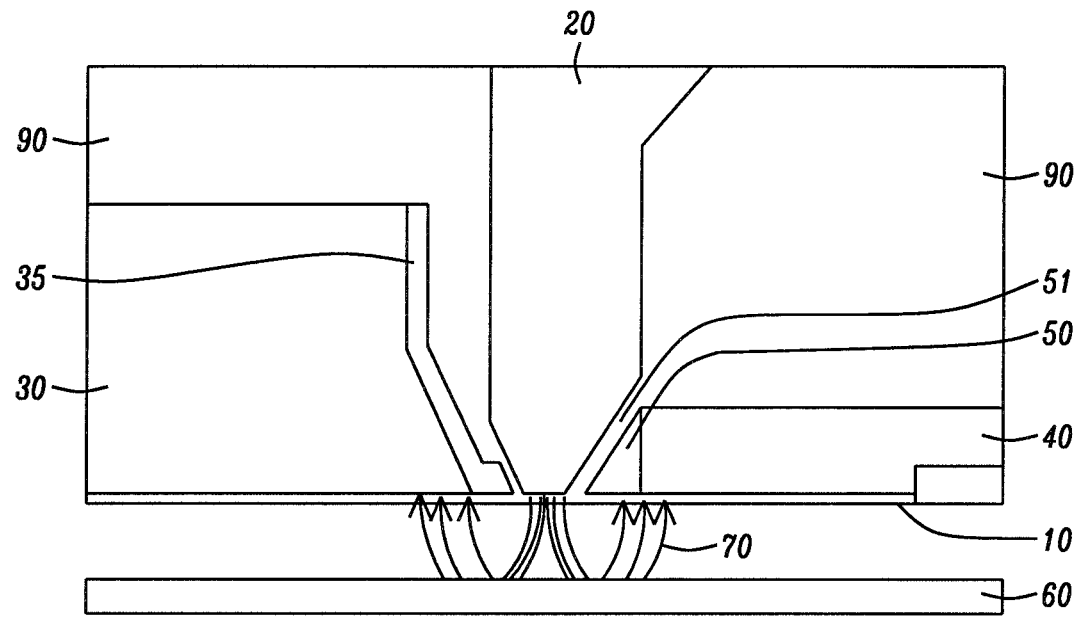
FIG. 1A is a schematic representation of a side, cross-sectional slice through the center of the main pole (MP) and leading (LS) and trailing (TS) shields, up to the ABS, of a prior-art PMR writer and also showing the soft magnetic underlayer (SUL) of a recording disk beneath the ABS with a depiction of flux lines passing from the MP and returning to the shields.
Figure 1B:
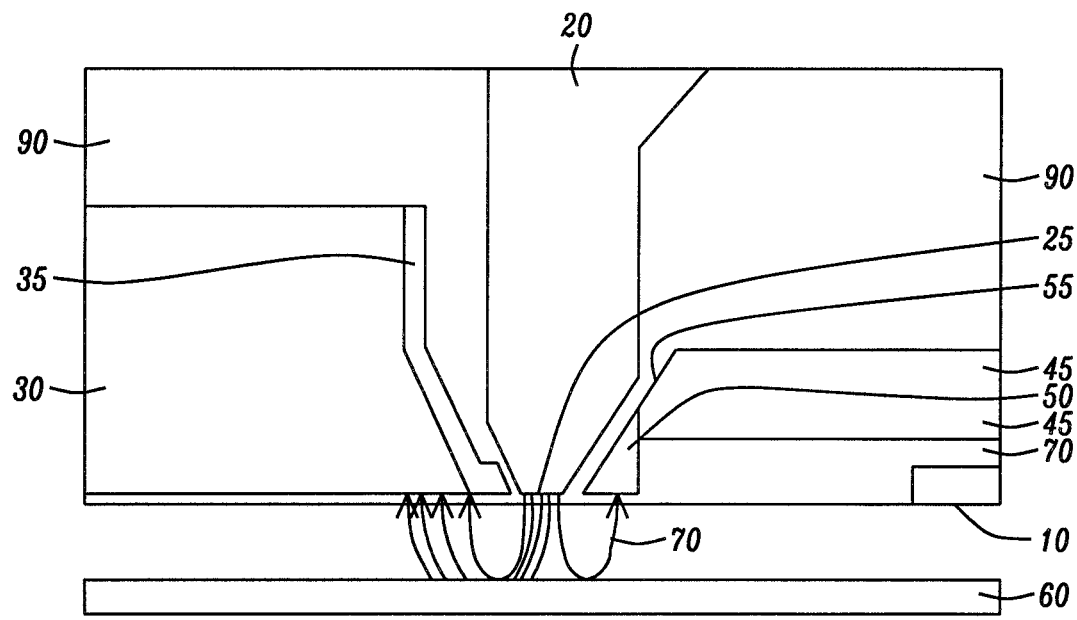
FIG. 1B is a schematic representation of a side, center cross-sectional slice through the main pole (MP) and leading (LS) and trailing (TS) shields, up to the ABS, of the presently disclosed PMR writer and also showing the SUL of a disk beneath the ABS with a depiction of flux lines passing from the MP and returning to the shields. The figure shows a recessed LS that now includes a leading edge taper (LET) which can be implemented in several different configurations (only one being shown).
Figure 2A:
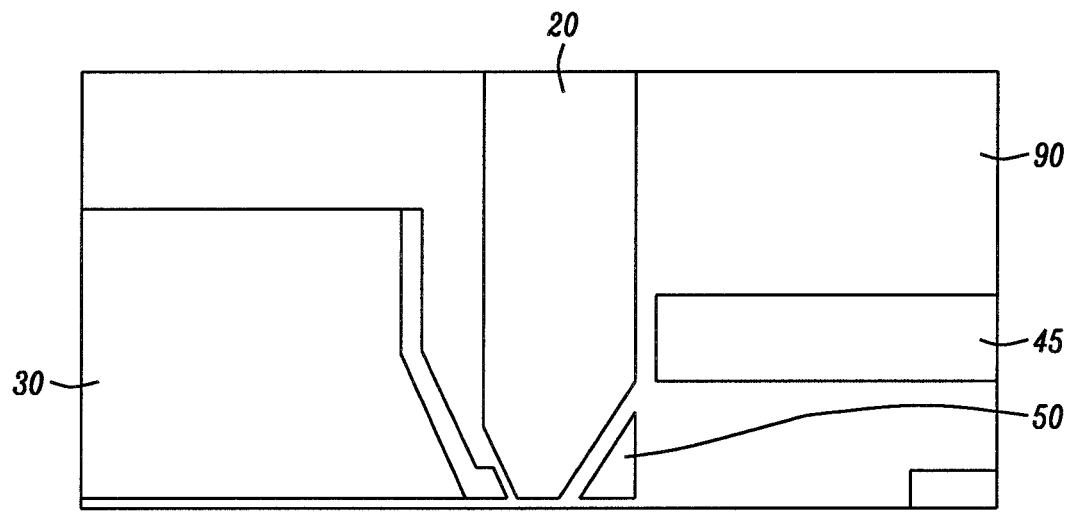
FIG. 2A is a schematic representation of a side cross-sectional view through the center of the presently disclosed PMR writer (as in FIG. 1B) with the LS being recessed further from the ABS than in FIG. 1A.
Figure 2B:
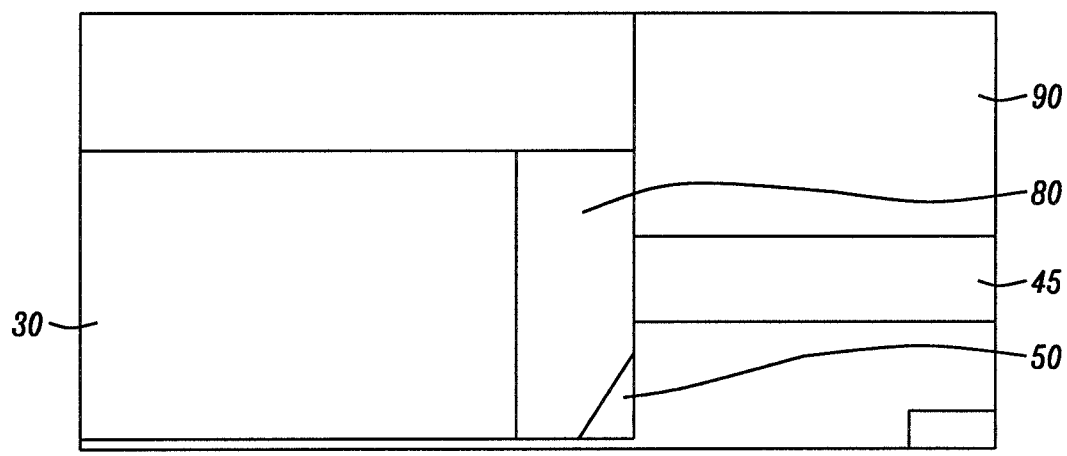
FIG. 2B is a schematic representation of a side cross-sectional view of the presently disclosed PMR writer, configured as in FIG. 2A but with the cross-sectional plane being off-center so that the SS can also be seen.
Figure 4A:
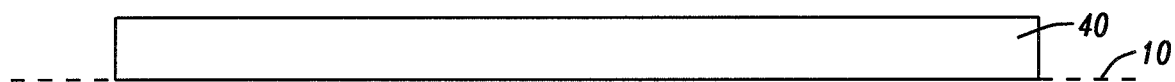
FIGS. 4A, 4B and 4C are, respectively, top-down view sketches of the LS in (4A) present (prior art) writer; (4B) recess configuration 1, LS recess all the way in the cross-track direction, and (4C) recess configuration 2, LS recess only in the center track. Arrow 103 shows recess height, arrow 102 shows LS throat height, and arrow 101 shows cross track recess width. The angle θ is the recess tilt angle, which can range from 10 degrees to 90 degrees.
Figure 4B:
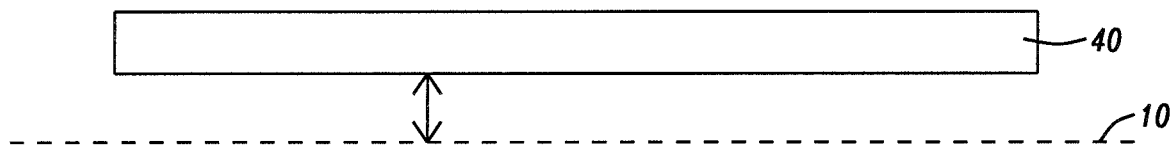
Figure 4C:
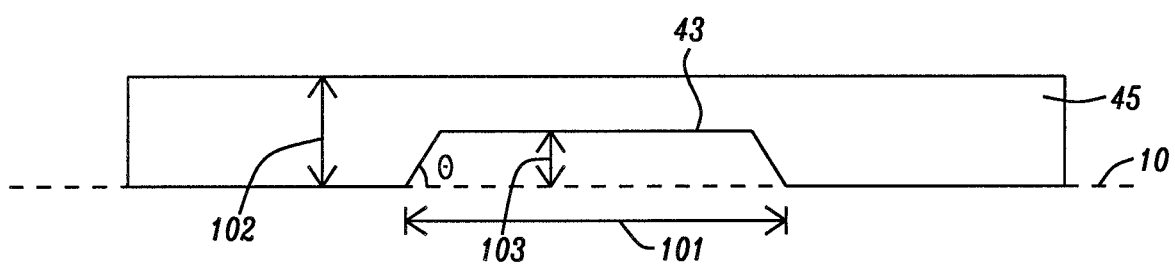

Referring to FIGS. 4A-4C, there is shown a sequence of schematic top-down views of the LS 40. In (4A) there is shown a prior art PMR writer where the entire shield 40 reaches the ABS 10; in (4B) there is shown the first recess configuration where the entire LS 40 is recessed (double ended vertical arrow) from the ABS 10 across its entire cross track direction (width of the figure), and, in (4C) there is shown the second recess configuration, where the LS 45 is recessed from the ABS 10 (small double arrow 103) only in a center portion 43 of the track. Here, the small double arrow 103 shows recess height (distance vertically above the ABS), the longer vertical arrow 102 shows LS throat height, and horizontal arrow 101 shows cross track recess width. The angle θ is the recess tilt angle, which can range from 10 degrees to 90 degrees.

Figure 5A:
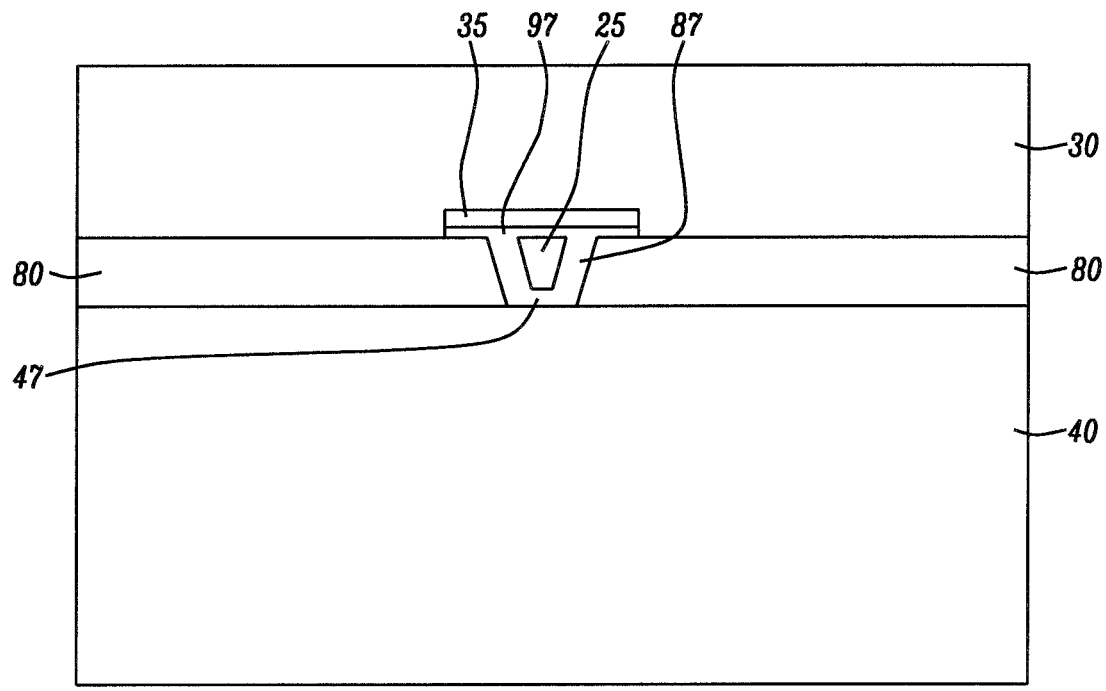
FIGS. 5A, 5B, 5C and 5D are, respectively, schematic ABS views of the LS in (5A) the prior art writer; (5B) recess configuration 1, LS recess all the way in the cross-track direction; (5C) recess configuration 2, LS recess only in the center track and (5D) recess of the LS and LET by different amounts.

Referring now to FIG. 5A, there is shown an ABS view of the face of a prior art PMR writer, as though looking up from the SUL of the recording media, showing the TS 30, the LS 40, two horizontally disposed SS 80, the face of the MP tip is 25, two dielectric filled side gap regions (SG) 87, a leading gap LG 47 just above the LS 40 and, in this case, a small high saturation magnetic moment shield ($B_s$, =24 kG) 35 positioned above the write gap WG 97. This high moment shield is not a necessary component of the design, however, and the design performs equally well in its absence. Note that the TS 30 is formed of a low saturation moment material with $B_s$=between approx. 16-19 kG and the LS 40 is formed of magnetic material with $B_s$=between approximately 10-19 kG. Note also that the leading shield LS 40 is not recessed from the ABS at any point.

Figure 5B:
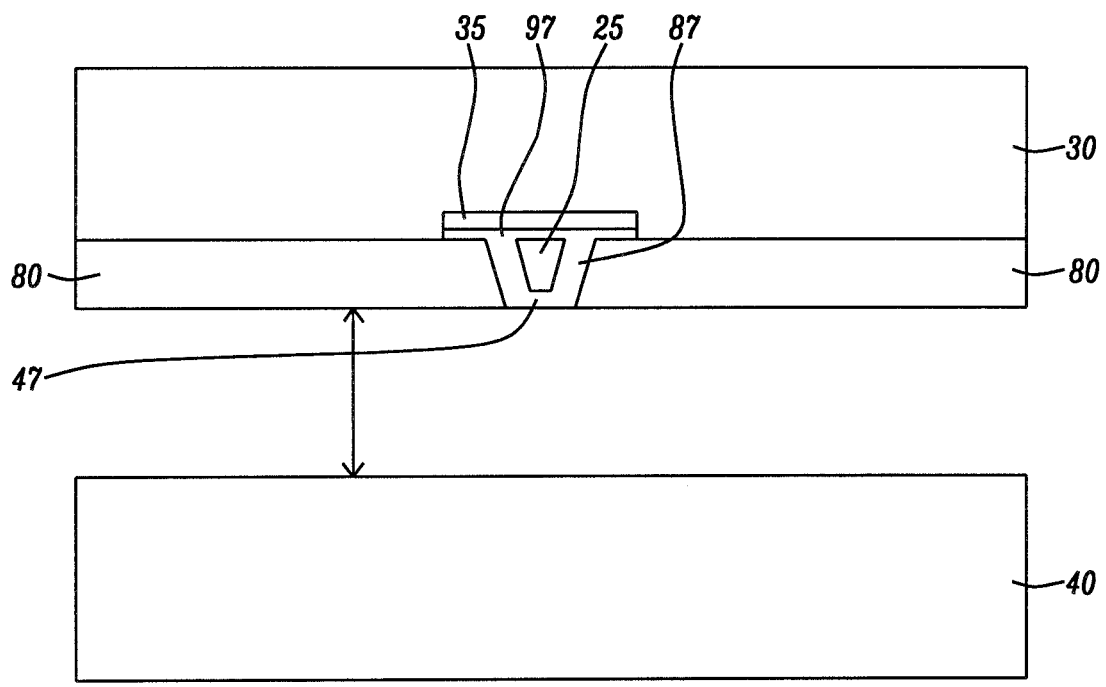

Referring next to FIG. 5B, there is shown the presently disclosed PMR writer in its first recessed LS configuration where an entire portion of LS 40, is now uniformly recessed away from the ABS plane in the proximal direction, along its entire cross-track extent. The recessed portion is shown as a space by the double arrow 104, where the double arrow indicates the width of the recessed portion in the down-track direction. The height of the recess (its distance away from the ABS) is shown as a double-ended arrow in FIG. 4B, which can be in the range between 200 nm and 1 um.

Figure 5C:
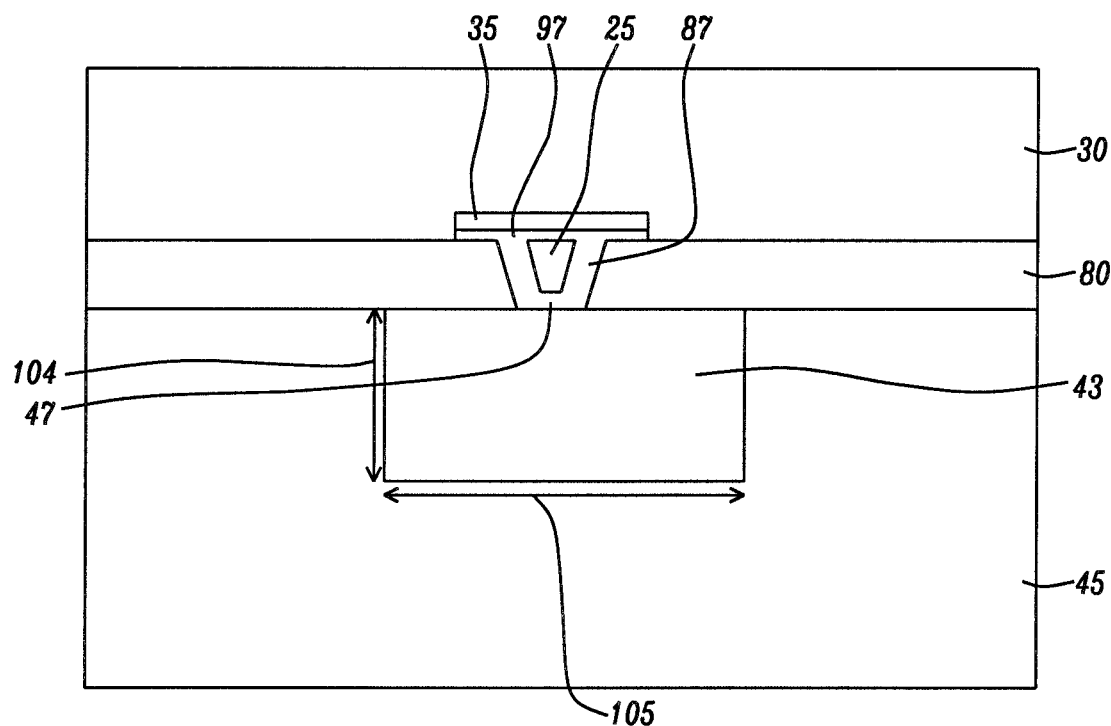

Referring next to FIG. 5C there is shown the presently disclosed PMR writer in a second recessed configuration (configuration 2) where the LS is recessed only in a region 43 within a central portion of the cross-track dimension and the lateral sides that extend out from that region are co-planar with the ABS plane. This region is shown in FIG. 4C as extending only partially in the cross-track direction (horizontal arrow) and partially in the down track direction (vertical arrow). The edges are beveled inward (proximally) as shown by the recess tilt angle θ in the side view of FIG. 4C. The illustration here is indicative of a θ=0 tilt angle. We must point out that this configuration shows an entire portion of the LS recessed away from the ABS. We must not forget that we have the LET to serve as an additional portion of the LS that can be independently recessed away from the ABS by any amount as will be illustrated in FIG. 5D below. The illustration in FIG. 5C shows a configuration where the LET has been recessed along with the LS portion and the rectangular region shows a uniformly recessed situation.

Figure 5D:
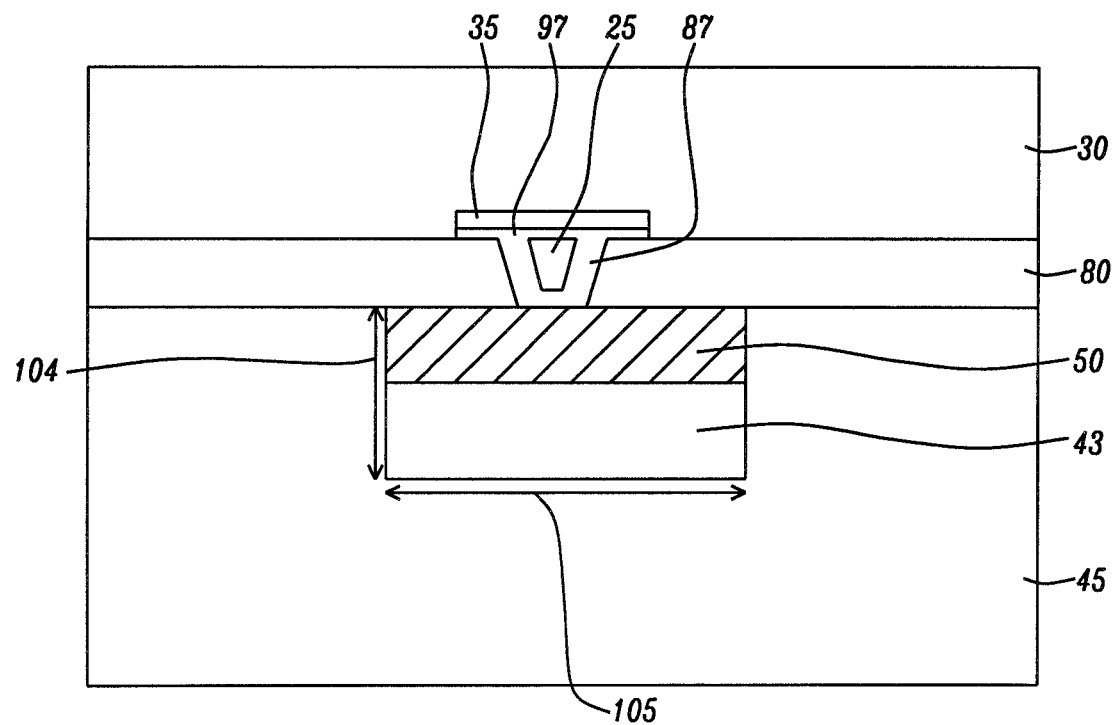

Referring now to FIG. 5D there is shown the configuration of FIG. 5C with a difference being that a small LET region 50 is shown within the rectangular region where a portion of the LS 43 has been recessed but the LET has not been recessed by the same amount. The LET is shown as shaded to indicate that its recess into the plane of the figure is not by the same amount as that of the LS portion 43.

Figure 6:
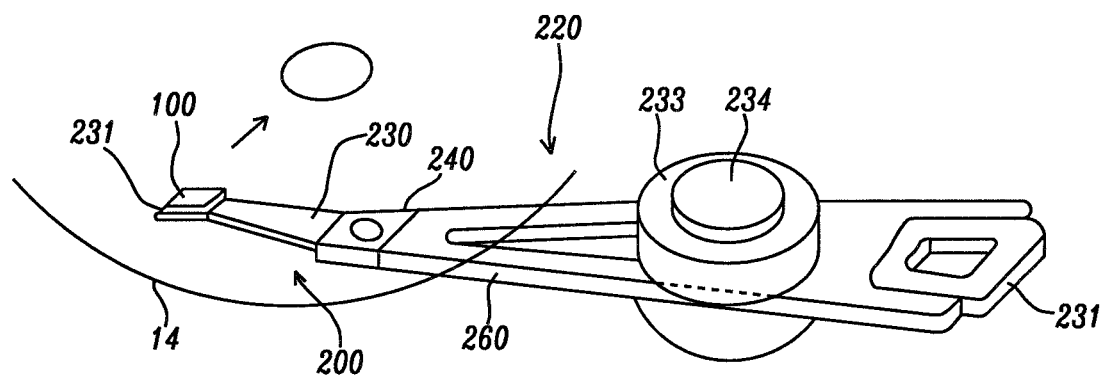
FIG. 6 schematically shows a perspective view of a head arm assembly of the present recording apparatus utilizing the disclosed PMR writer.

FIG. 6 shows a head gimbal assembly (HGA) 200 that includes the slider-mounted present PMR writer 100 and a suspension 220 that elastically supports the PMR writer 100. The suspension 220 has a spring-like load beam 230 made with a thin, corrosion-free elastic material like stainless steel. A flexure 231 is provided at a distal end of the load beam and a base-plate 240 is provided at the proximal end. The PMR writer 100 is attached to the load beam 230 at the flexure 231 which provides the PMR writer with the proper amount of freedom of motion. A gimbal part for maintaining the PMR writer at a proper level is provided in a portion of the flexure 231 to which the PMR writer 100 is mounted.

A member to which the HGA 200 is mounted to arm 260 is referred to as head arm assembly 220. The arm 260 moves the PMR 100 in the cross-track direction (arrow) across the medium 14. A hard disk, here shown, transparently, as being above the arm, is mounted on a spindle, but only the mounting hole is shown for clarity. One end of the arm 260 is mounted to a base plate (not shown). A coil 231 to be a part of a voice coil motor is mounted to the other end of the arm 260. A bearing part 233 is provided to the intermediate portion of the arm 260. The arm 260 is rotatably supported by a shaft 234 mounted to a bearing part 233. The arm 260 and the voice coil motor that drives the arm 260 configure an actuator.

Figure 7:
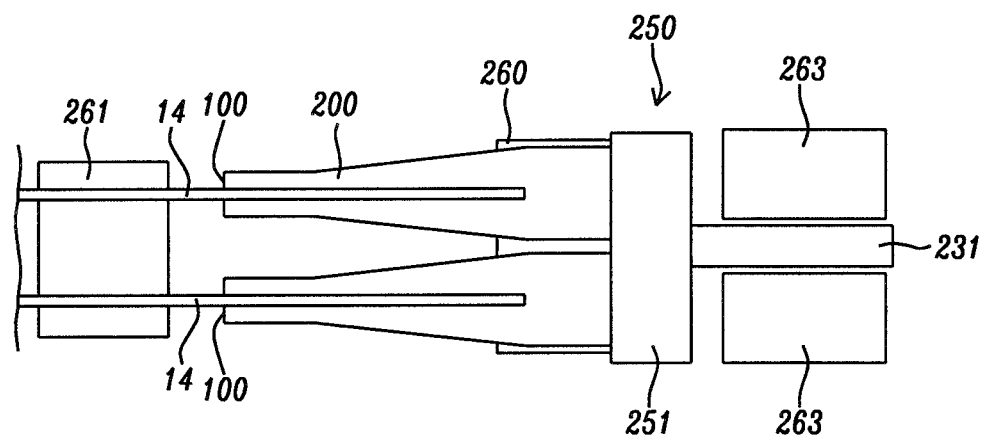
FIG. 7 schematically shows a side view of a head stack assembly of the present recording apparatus.
Figure 8:
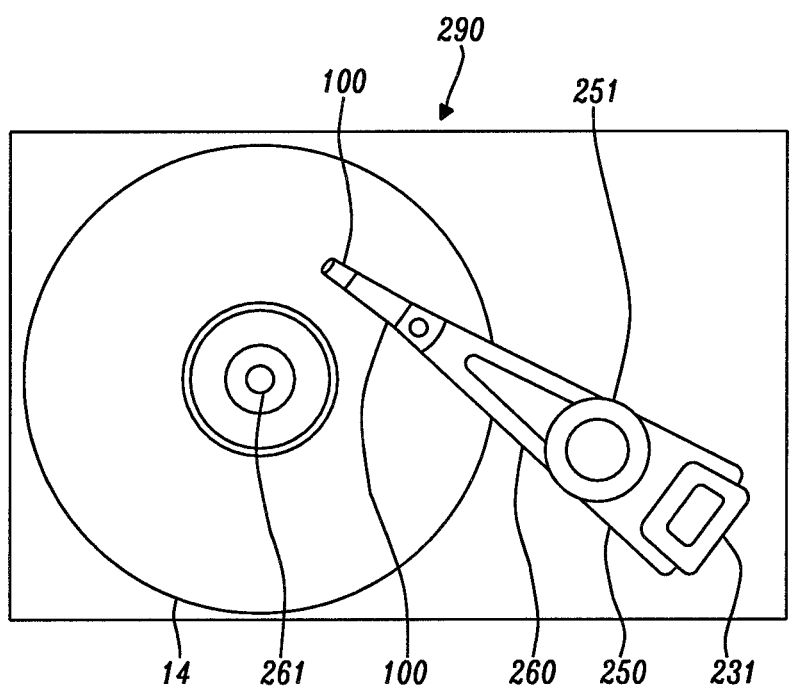
FIG. 8 schematically shows a plan view of the magnetic recording apparatus within which are mounted the components shown in FIGS. 6 and 7.

Referring next to FIG. 7 and FIG. 8, there is shown a head stack assembly and a magnetic recording apparatus in which the PMR writer 100 is contained. The head stack assembly is an element to which the HGA 200 is mounted to arms of a carriage having a plurality of arms. FIG. 7 is a side view of this assembly and FIG. 8 is a plan view of the entire magnetic recording apparatus.

A head stack assembly 250 has a carriage 251 having a plurality of arms 260. The HGA 200 is mounted to each arm 260 at intervals to be aligned in the vertical direction. A coil 231 (see FIG. 6), which is to be a portion of a voice coil motor is mounted at the opposite portion of the arm 260 in the carriage 251. The voice coil motor has a permanent magnet 263 arranged at an opposite location across the coil 231. Two disks 14 are shown in side view mounted on a spindle motor 261.

Referring finally to FIG. 8, the head stack assembly 250 is shown incorporated into a magnetic recording apparatus 290. The magnetic recording apparatus 290 has a plurality of magnetic recording media 14 mounted on a spindle motor 261. Each individual recording media 14 has two PMR elements 100 arranged opposite to each other across the magnetic recording media 14 (shown clearly in FIG. 7). The head stack assembly 250 and the actuator (except for the PMR writer itself) act as a positioning device and support the PMR writers 100. They also position the PMR writers correctly opposite the media surface in response to electronic signals. The PMR records information onto the surface of the magnetic media by means of the magnetic pole contained therein.

As is understood by a person skilled in the art, the present description is illustrative of the present disclosure rather than limiting of the present disclosure. Revisions and modifications may be made to methods, materials, structures and dimensions employed in forming and providing a PMR writer with a leading edge shield that is recessed from an ABS in several configurations, while still forming and providing such a structure and its method of formation as defined by the appended claims.

What is claimed is:

1. A write head for perpendicular magnetic recording (PMR) comprising:

a main pole, tapered along a leading edge to produce a distal narrowing, having a distal pole tip that terminates in an air bearing surface (ABS) plane;

a trailing shield (TS) formed at a trailing edge side of said pole tip, said TS having a distal planar edge that is co-planar with said ABS plane;

horizontally disposed side shields (SS) symmetrically formed to each side of said pole tip, said SS having distal planar edges that are co-planar with said ABS plane;

a leading shield (LS) layer formed at a leading edge side of said pole tip, wherein said LS layer has a planar distal edge comprising two connected portions, each parallel to said ABS plane, wherein a first portion has a distal edge that is co-planar with said ABS plane or is positioned proximally away therefrom and parallel with said ABS plane and a second portion, formed in said first portion, that is recessed proximally relative to said first portion;

a leading edge taper (LET) layer, independent of and separated from said recessed portion of said leading shield (LS) layer, said LET layer being formed adjacent to said leading shield layer and between said recessed portion of said leading shield layer and said pole tip, wherein a tapered trailing edge surface of said leading edge taper (LET) layer is conformally adjacent to said tapered leading edge of said main pole and has a planar distal edge that is parallel to said ABS plane and parallel to and positioned independently of said distal edge of said LS layer;

wherein either said first portion of said LS layer or said planar distal edge of said LET layer is recessed proximally away from said ABS plane or both said first portion of said LS layer and said planar distal edge of said LET layer are recessed proximally away from said ABS plane, whereby a reduction in return magnetic flux to said LET layer and said recessed portion of said LS layer occurs at said leading edge side of said main pole and a corresponding increase in return magnetic flux occurs at the trailing edge side of said main pole.

2. The write head of claim 1 wherein said SS have a throat height of approximately 600 nm.

3. The write head of claim 1 wherein said recessed portion of said LS layer has a cross-track width of up to approximately 20 μm.

4. The write head of claim 1 wherein said trailing shield (TS) includes a small layer of high saturation moment material of Bs of approximately 24 kG immediately adjacent to the pole tip whereas the remainder of said TS is formed of low saturation material of Bs between 16 and 19 kG.

5. The write head of claim 1 wherein the material for said LS layer and LET layer can be independently chosen, but shall have its Bs in a range between 1 kG and 19 kG and lower than that for the SS material.

6. The write head of claim 1 wherein all shields that are immediately adjacent to said main pole are nevertheless separated from said main pole by gap regions that are filled with dielectric material or non-magnetic metals.

7. A head gimbal assembly, comprising
the write head of claim 1, wherein said write head is mounted in a slider;
a suspension that elastically supports said slider-mounted write head, wherein
said suspension has a flexure to which said slider-mounted write head is joined, a load beam with one end connected to said flexure and a base plate connected to the other end of said load beam.

8. A magnetic recording apparatus, comprising:
the head gimbal assembly of claim 7;
a magnetic recording medium positioned opposite to said slider;
a spindle motor that rotates and drives said magnetic recording medium;
a device that supports the slider and that positions said slider relative to said magnetic recording medium.

* * * * *